United States Patent
Desplats et al.

(10) Patent No.: US 8,344,538 B2
(45) Date of Patent: Jan. 1, 2013

(54) WIND-POWERED DEVICE FOR PRODUCING ELECTRICAL ENERGY

(75) Inventors: Romain Desplats, Castanet Tolosan (FR); Frederic Fevrier, Ramonville St Agne (FR)

(73) Assignee: Centre National d'Etudes Spatiales (C.N.E.S.), Paris (FR)

( * ) Notice: Subject to any disclaimer, the term of this patent is extended or adjusted under 35 U.S.C. 154(b) by 791 days.

(21) Appl. No.: 12/374,696

(22) PCT Filed: Jul. 20, 2007

(86) PCT No.: PCT/FR2007/001254
§ 371 (c)(1),
(2), (4) Date: Sep. 2, 2009

(87) PCT Pub. No.: WO2008/012420
PCT Pub. Date: Jan. 31, 2008

(65) Prior Publication Data
US 2012/0187695 A1    Jul. 26, 2012

(30) Foreign Application Priority Data
Jul. 24, 2006 (FR) ...................................... 06 06744

(51) Int. Cl.
*F03D 9/00* (2006.01)
*H02P 9/04* (2006.01)
(52) U.S. Cl. .............................. 290/55; 290/44; 415/4.1
(58) Field of Classification Search .................... 290/55, 290/54, 44, 43; 415/4.1
See application file for complete search history.

(56) References Cited

U.S. PATENT DOCUMENTS

| | | | |
|---|---|---|---|
| 1,876,595 A | 9/1932 | Beldimano | |
| 2,169,165 A | 8/1939 | Reedy | |
| 3,222,533 A | 12/1965 | MacKay | |
| 6,998,723 B2 * | 2/2006 | Kong et al. | 290/1 C |
| 7,218,014 B2 * | 5/2007 | Steinke | 307/84 |
| 7,307,356 B2 * | 12/2007 | Fraenkel | 290/54 |
| 7,309,930 B2 * | 12/2007 | Suryanarayanan et al. | 290/55 |
| 2004/0237683 A1 | 12/2004 | Mikhail et al. | |

(Continued)

FOREIGN PATENT DOCUMENTS
DE 397391 7/1924
(Continued)

OTHER PUBLICATIONS
International Search Report dated Jan. 16, 2008, in PCT application.

*Primary Examiner* — Hae Moon Hyeon
(74) *Attorney, Agent, or Firm* — Young & Thompson

(57) ABSTRACT

A wind-powered device for producing electrical energy includes an electric generator set (1) which works by converting mechanical energy into the electrical energy, a wind-powered set (3) designed to capture the energy of the wind and convert it into mechanical energy, a transmission (2) positioned between the wind-powered set (3) and the generator set (1), the transmission (2) being designed to transmit mechanical energy produced by the wind-powered set (3) to the generator set (1), characterized in that the wind-powered set (3) includes at least two air turbines known as wind turbines (4) including non-coaxial shafts (5) coupled to the transmission (3), the wind turbines (4) being designed in such a way as to present an equivalent surface area to the wind that exceeds the surface area exposed to the wind of each of the wind turbines (4).

9 Claims, 3 Drawing Sheets

U.S. PATENT DOCUMENTS

| | | | |
|---|---|---|---|
| 2006/0066111 A1* | 3/2006 | Suryanarayanan et al. | 290/44 |
| 2009/0121487 A1* | 5/2009 | Fraenkel | 290/53 |

FOREIGN PATENT DOCUMENTS

| | | |
|---|---|---|
| DE | 3140010 | 4/1983 |
| DE | 8906682 | 7/1989 |
| EP | 0050891 | 5/1982 |
| FR | 1074780 | 10/1954 |
| FR | 2504603 | 10/1982 |
| FR | 2868483 | 10/2005 |
| FR | 2890706 | 3/2007 |
| GB | 331683 | 7/1930 |
| JP | 2002202046 | 7/2002 |
| JP | 2004162684 | 6/2004 |
| JP | 2004340116 | 12/2004 |
| JP | 2005023893 | 1/2005 |

* cited by examiner

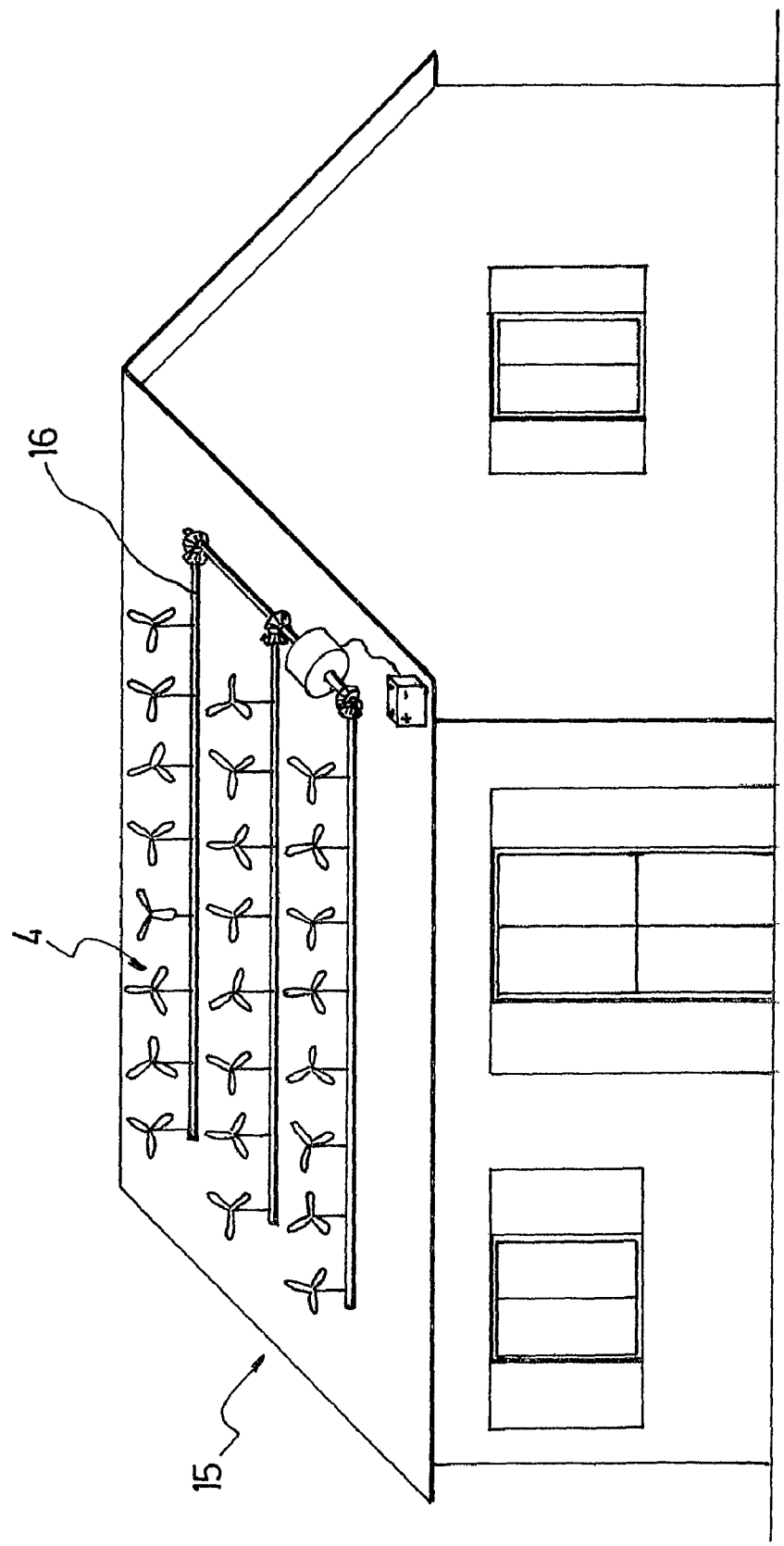

WIND-POWERED DEVICE FOR PRODUCING ELECTRICAL ENERGY

BACKGROUND OF THE INVENTION

1. Field of the Invention

The invention relates to a wind-powered device for producing electrical energy.

The constant increase in the costs of fossil sources of energy, allied with a depletion of the fossil-fuel reserves—oil, coal, natural gas—and with an awareness of the imbalance that they cause in the carbon cycle, has resulted in numerous investigations intended to develop devices for producing renewable and inexhaustible energy, in particular wind-powered devices for producing energy.

2. Description of Related Art

There exist a great number of wind-powered devices for producing electrical energy. The general principle of these devices, which derives from the principle of the windmills used formerly for pumping water or grinding grain, consists in utilising the force of the wind in order to drive a shaft in rotation and to place an electrical machine, such as a generator, at the end of this shaft, so that it is able to convert the mechanical energy of the shaft into electrical energy. In order to do this, a wind-powered device typically includes a blade wheel that is suitable to ensure the setting of a shaft in rotation by conversion of the energy of the wind into mechanical energy, a rotor including magnets and coils, which is arranged at the end of the shaft and the rotation of which enables the generation of an inductive field which is picked up across the stator of an alternator, ensuring the production of an electric current.

In particular, it is known to arrange a plurality of wind turbines in a given space, in order to set up a wind-powered power station. Each wind turbine of the wind-powered power station includes a shaft, at one end of which an electrical machine, such as a generator, is arranged. The currents generated by this plurality of generators are added up by the wind-powered power station for the purposes of being able to be conveyed by a network for transmitting electricity to users.

Since the amount of energy produced by a wind turbine is, in a first approximation, proportional to the speed of rotation of the rotor of the electrical machine, itself dependent on the speed of rotation of the wind turbine, the known devices have recourse to blades that are as large as possible, so as to enable high speeds to be attained, even in low wind.

Furthermore, large blades enable a torque to be attained at start-up that is sufficient to start the wind turbine.

The drawbacks of such a device relate to the complexity of the device, in particular as far as the design of the blades is concerned, the difficulties of installation and implementation, the manufacturing costs, the noise generated by the rotation of the blades, etc. Such devices are therefore reserved for large producers of energy, have to be installed far from dwellings, and for this reason are totally unsuitable for urban or periurban domestic use.

In order to facilitate the start-up of wind turbines without nevertheless resorting to oversize blades, it is known to attach a device, in particular an electric device, for assisting the start-up of the wind turbines.

This solution only reinforces the drawbacks linked to the complexity and cost of such a device.

In order to overcome these problems in part, other devices have been proposed in order to increase the speed of rotation of the rotor and the torque at start-up without nevertheless resorting to oversize blades. For example, JP 2004-162684 describes a wind-powered device for producing electrical energy including two wind turbines that are suitable to rotate in opposite directions, one including the rotor of the alternator, and the other including the stator of the alternator. Consequently the apparent speed of rotation of the rotor in relation to the stator is approximately doubled in comparison with a device with fixed stator.

The drawback of this device relates, in particular, to an output that is not highly optimised, because of the arrangement of the blade wheels opposite one another, the leeward wheel then necessarily catching the wind less that the windward wheel. Moreover, the windward wheel creates turbulences that are capable of impeding the good rotation of the leeward wheel.

JP 2004-340116 describes a wind-powered device including a shaft, around which a plurality of blade wheels are arranged and at the end of which a generator is arranged. Such a device therefore enables the generation of a substantial torque at start-up, enabling the driving of the rotor of the generator without any auxiliary device for assisting start-up.

On the other hand, the speed of rotation of the rotor is limited and remains dependent on the dimensions of the blade wheels arranged on the shaft of the device.

Furthermore, the problem linked to the arrangement of the windward and leeward wheels remains.

SUMMARY

The objective of the invention is to provide a wind-powered device for producing electrical energy that overcomes said drawbacks.

The invention provides a wind-powered device for producing electrical energy which is economical; moreover the implementation of said device is simple and does not require fine and/or complex adjustments.

The invention provides a wind-powered device for producing electrical energy which generates little noise.

The invention also provides a wind-powered device for producing electrical energy which is suitable for domestic use.

The invention also provides a wind-powered device for producing electrical energy which is suitable for urban and periurban use.

The invention also provides a wind-powered device for producing electrical energy, the maintenance of which is easy, even by a non-specialist.

In order to do this, the invention relates to a wind-powered device for producing electrical energy including:
- a generating set suitable to generate electrical energy by conversion of mechanical energy into this electrical energy,
- a wind-powered assembly suitable to capture energy from the wind and to convert it into mechanical energy,
- a transmission arranged between said wind-powered assembly and said generating set, said transmission being suitable to transmit mechanical energy produced by said wind-powered assembly to said generating set, said wind-powered assembly including at least two air turbines, so-called wind turbines, including non-coaxial shafts coupled to said transmission and arranged in such a way that said wind turbines are able to present a surface area to the wind, so-called equivalent surface area, that is greater than the windward surface area of each of the wind turbines.

A wind-powered device according to the invention therefore enables the production of electrical energy by the co-operation of at least two non-coaxial wind turbines with a generating set. Moreover, a device according to the invention—including at least two non-coaxial wind turbines arranged in such a way that they are able to present an equivalent surface area to the wind that is greater than the windward surface area of each of the wind turbines—enables the area of the windward equivalent surface area that is swept by the totality of the wind turbines in the course of their rotations to be greater than the area of the windward surface area that is swept by each of these wind turbines in the course of their respective rotations. The windward surface area of a wind turbine is the surface area of a wind turbine in direct contact with the wind before the latter is, in part, slowed down by other wind turbines. In other words, it is a question of the surface area of a wind turbine that is not masked by any other wind turbine of the device. Since the power that is recoverable by a wind turbine is, in a first approximation, proportional to the area of the surface swept by the blades of the wind turbine and to the cube of the speed of the wind, a device according to the invention makes it possible to provide more power than a wind-powered device including wind turbines with coaxial shafts. Throughout the text, two wind turbines are called non-coaxial if their shafts are non-coaxial.

The inventors have succeeded in transcending the prejudice of a person skilled in the art, which consists in systematically arranging the electrical machine for generating electrical energy within the axis of the wind turbine. In particular, the inventors have determined that a wind-powered device including at least two non-coaxial wind turbines, in particular of small dimensions, makes it possible to generate an amount of electrical energy that is sufficient for domestic applications, despite a loss of output induced by the use of a more complex transmission than in the prior art.

Furthermore, a wind-powered device according to the invention including wind turbines, the arrangement of which enables the equivalent surface area directly caught by the wind swept by the totality of the wind turbines to be greater than the windward surface area of each of the wind turbines, contributes to providing a substantial torque at start-up without nevertheless requiring a device for assisting start-up.

Furthermore, the inventors have devised a lower-cost device by replacing the electrical addition of the wind-powered devices of the prior art with a mechanical addition. In particular, it is more economical to develop a mechanical transmission that is suitable to ensure the rotation of a single shaft starting from the rotation of a plurality of shafts than to have a plurality of electrical machines. Consequently a wind-powered device according to the invention may include a plurality of non-coaxial wind turbines and a single generator, enabling the generation of electrical energy in a more economical manner than with the devices of the prior art.

The generating set according to the invention may include one or more electrical machines. Nevertheless, advantageously and according to the invention, said generating set includes a single electrical machine.

An electrical machine according to the invention is, in known manner, a d.c. generator, an alternator with permanent magnets or a brushless alternator.

An air turbine according to the invention may be an axial turbine or a radial turbine. Typically, an axial air turbine takes the form of a turbine with a horizontal axis, and a radial air turbine takes the form of a turbine with a vertical axis. In particular, an air turbine according to the invention may be a wind turbine known under the name 'conventional wind turbine', including a plurality of blades arranged around a shaft and forming an airscrew, a wind turbine with sails, a wind turbine of the Savonius type with a horizontal or vertical axis, a wind turbine of conventional Darrieus type or of delta type, etc.

Nevertheless, advantageously and according to the invention, said wind-powered assembly includes at least two axial air turbines having non-coaxial shafts coupled to the transmission and arranged in such a way that said turbines are able to present a surface area to the wind that is greater than the windward surface area of each of the turbines.

An axial air turbine is an air turbine which has a good cost/output ratio and the manufacture and implementation of which are easy.

A transmission according to the invention may be of any known type. A transmission according to the invention makes it possible to transmit mechanical energy produced by the wind-powered assembly to the generating set, the wind-powered assembly including at least two non-coaxial wind turbines, so that the mechanical energy produced by the wind-powered assembly, in particular the torque at start-up of the wind-powered assembly, can be more substantial than that produced by a wind-powered assembly of the prior art.

Advantageously and according to the invention, said transmission has at least one shaft, the so-called primary shaft, coupled to said generating set, and at least one shaft, the so-called input shaft, coupled to said wind-powered assembly, said input shaft being driven in rotation by at least two wind turbines having non-coaxial shafts pertaining to said wind-powered assembly.

Couplings between rotating shafts are easy to realise and enable transmissions of torque and speed at known output. Furthermore, the kinematics of such couplings are easy to perceive and enable simple maintenance, even by a non-specialist.

Furthermore, a transmission according to the invention having at least one input shaft that is suitable to be driven in rotation by at least two non-coaxial wind-turbine shafts makes it possible to provide the input shaft with a torque at start-up that is greater than the torque of each of these wind-turbine shafts. Consequently the torque transmitted to the primary shaft can be greater than the torque of each of the wind-turbine shafts. Now it is known that the torque at start-up of a wind-turbine shaft is proportional to the surface area swept by the wind turbine—that is to say, to the length and/or the width of the blades that constitute this wind turbine. For this reason in particular, the wind-powered devices typically have large blades, in order to enable the provision of a torque at start-up that is sufficient and compatible with the setting of the generating set in rotation. In the case of an insufficient torque at start-up, some devices of the prior art require an external auxiliary device enabling rotation to be initiated. A wind-powered device according to the invention makes it possible, on the contrary, by virtue of the engagement of a plurality of wind-turbine shafts on the same input shaft, to provide a torque at start-up that is greater than each of the torques of each of the wind turbines, without nevertheless necessitating recourse to oversize blades or to external devices for assisting the setting in rotation.

A wind-powered device according to the invention may have a single input shaft which coincides with the primary shaft. In a variant, a wind-powered device may have a plurality of input shafts, the latter all driving the same intermediate shaft, distinct from the primary shaft. According to another variant, a device according to the invention may have one or more shafts which are driven by one or more intermediate shafts and suitable to drive the primary shaft. The transmission of a wind-powered device according to the invention is not limited in number of shafts or in type of arrangement between the shafts.

The couplings between the shafts may be realised by any means known as such. They may, in particular, be realised by means of gears, such as pinion gears, in particular pinions with spur toothing, pinions with helical toothing, etc. They may also be realised by means of bevel gears, hypoid gears, cylindrical gears, herringbone gears, worm gears, etc, or by means of gear trains, such as epicyclic trains, spherical trains, etc.

The couplings between the shafts may also be realised by means of belts, magnetic contacts, hydraulic devices, etc.

Advantageously and according to the invention, at least one pinion, so-called driven pinion, is mounted on at least one input shaft of said transmission, and at least two pinions, so-called driving pinions, are mounted respectively on two wind turbine shafts, said driving pinions being suitable to be coupled to said driven pinion, so that these two wind turbines are able to drive this input shaft in rotation.

In standard manner the driving pinions and the driven pinion are chosen in such a way as to have an identical pitch, a necessary condition to enable engagement.

Furthermore, each driving pinion of a wind-turbine shaft may have a number of teeth identical to the number of teeth of the driven pinion of the input shaft with which it is engaged, so that the speed of rotation of the input shaft is the same as the speed of this shaft of the wind turbine. The driving pinion of a wind-turbine shaft may also have a lower or higher number of teeth than the number of teeth of the driven pinion, so that the speed of the output shaft is respectively lower or higher than the speed of rotation of this shaft of the wind turbine. The pinions of the wind-turbine shafts engaged on the same output shaft may have an identical or different number of teeth.

Nevertheless, advantageously and according to the invention, at least two driving pinions of at least two wind-turbine shafts have a different number of teeth.

Such a gear system offers a wide range of use of the wind-powered device. In particular, two wind turbines having driving pinions with a different number of teeth engaged with the same driven pinion of an input shaft enable a progressive start-up of the wind-powered device. Even in low wind, the wind turbine linked to the gear pinion having the largest number of teeth, the so-called start-up wind turbine, will impose its speed of rotation on the input shaft. On the other hand, when the wind increases, the wind turbine linked to the gear pinion having a less substantial number of teeth imposes its speed on the input shaft. The start-up wind turbine will then, in part, brake the input shaft, not only ensuring a progressive start-up for a device according to the invention but also constituting a guarantee against a risk of racing of the wind-powered device.

A wind-powered device according to the invention may include a plurality of start-up wind turbines having a different number of teeth, so that the start-up of the wind-powered device can be effected in progressive manner.

Advantageously, a device according to the invention may be equipped with free wheels, the function of which is to limit, if necessary, the effects of braking of the wind turbines linked to the pinions forming transmission ratios with the driven pinion of less than 1.

In a variant or in combination, the transmission includes couplings by means of belts and/or by means of chains.

In a variant or in combination, the transmission includes hydraulic couplings.

A wind-powered assembly according to the invention includes at least two wind turbines with non-coaxial shafts.

Nevertheless, advantageously and according to the invention, the wind-powered assembly includes at least fifty wind turbines, in particular two hundred wind turbines.

All the wind turbines, or simply some of them, may be non-coaxial.

Advantageously, a wind turbine according to the invention has blades arranged around the shaft of this wind turbine. A wind turbine according to the invention may have one, two, three, four, five blades, or even more. These blades may be manufactured from any type of material, in particular from plastic, wood, glass fibres, carbon fibre, etc, and may exhibit all types of dimensions.

Nevertheless, advantageously and according to the invention, each wind turbine has at least two blades which are arranged around its shaft and suitable to drive this shaft in rotation by the action of the wind, said blades having lengths less than 30 cm, in particular of the order of 10 cm.

A wind turbine according to the invention exhibiting blades with a length of less than 30 cm, in particular of the order of 10 cm, is very economical to manufacture. Such a wind turbine will advantageously be manufactured from recyclable plastic, so that a device according to the invention has not only an advantageous cost of manufacture but also constitutes an ecological device.

A wind turbine of a wind-powered device according to the invention may also be constituted by a wind-powered microsystem, in particular with a vertical axis, so as to be able to drive its shaft in rotation, in particular by means of a surface wind. Such a microsystem exhibits micro-blades having a length less than 1 cm, in particular less than 1 mm. A wind-powered device equipped with a plurality of such micro wind turbines makes it possible to set up a source of energy that is suitable, in particular, for the power supply of an electronic device. It is consequently conceivable to associate a wind-powered device according to the invention with each apparatus requiring an electrical power supply, such as a domestic electrical appliance, a television, a telephone, etc.

A wind-powered device according to the invention is not only suitable for the power supply of a given apparatus but also for the power supply of a dwelling or a set of dwellings.

In order to do this in particular, a wind-powered device according to the invention advantageously includes a large number of small wind turbines, the length of the blades of which is of the order of 10 cm. Since these wind turbines are non-coaxial, they may be arranged in such a way that their axes are in the direction of the wind and remain in the direction of the wind, for example by virtue of a known weather-vane system. Consequently the area of the equivalent surface swept by the totality of the wind turbines is substantially equal to the sum of the areas of the surfaces swept by each of the wind turbines. Consequently a wind-powered device according to the invention enables ratings to be attained that are substantially equal to those of a single wind turbine with large blades sweeping a surface area substantially equal to the equivalent surface area swept by the totality of the wind turbines.

In the event of failure of one of the wind turbines, it is very easy and very economical to replace it. Furthermore, a device according to the invention can continue to function even in the event of failure of one of the wind turbines.

Advantageously, a wind-powered device according to the invention includes at least two hundred wind turbines, each wind turbine having at least two blades with a length of 10 cm, so that the area of the swept surface for each wind turbine is, in square meters, of the order of $0.01\pi$, said device being suitable to produce of the order of 0.01 kW per square meter of surface area in the presence of a wind of the order of 15 km/h.

The invention relates, in addition, to a wind-powered device for producing electrical energy, characterised by all or some of the characteristics mentioned above or below in combination.

BRIEF DESCRIPTION OF THE DRAWINGS

Other characteristics, objectives and advantages of the invention will become apparent from the following description which presents, by way of non-limiting example, embodiments of the invention with reference to the annexed drawings; in these drawings:

FIG. 3 is a schematic perspective view of a wind-powered device according to an embodiment of the invention mounted on a dwelling.

DETAILED DESCRIPTION OF PREFERRED EMBODIMENTS

In the Figures the proportions between the various components and the scales have not been respected, for the purposes of clarity.

Figure 1:
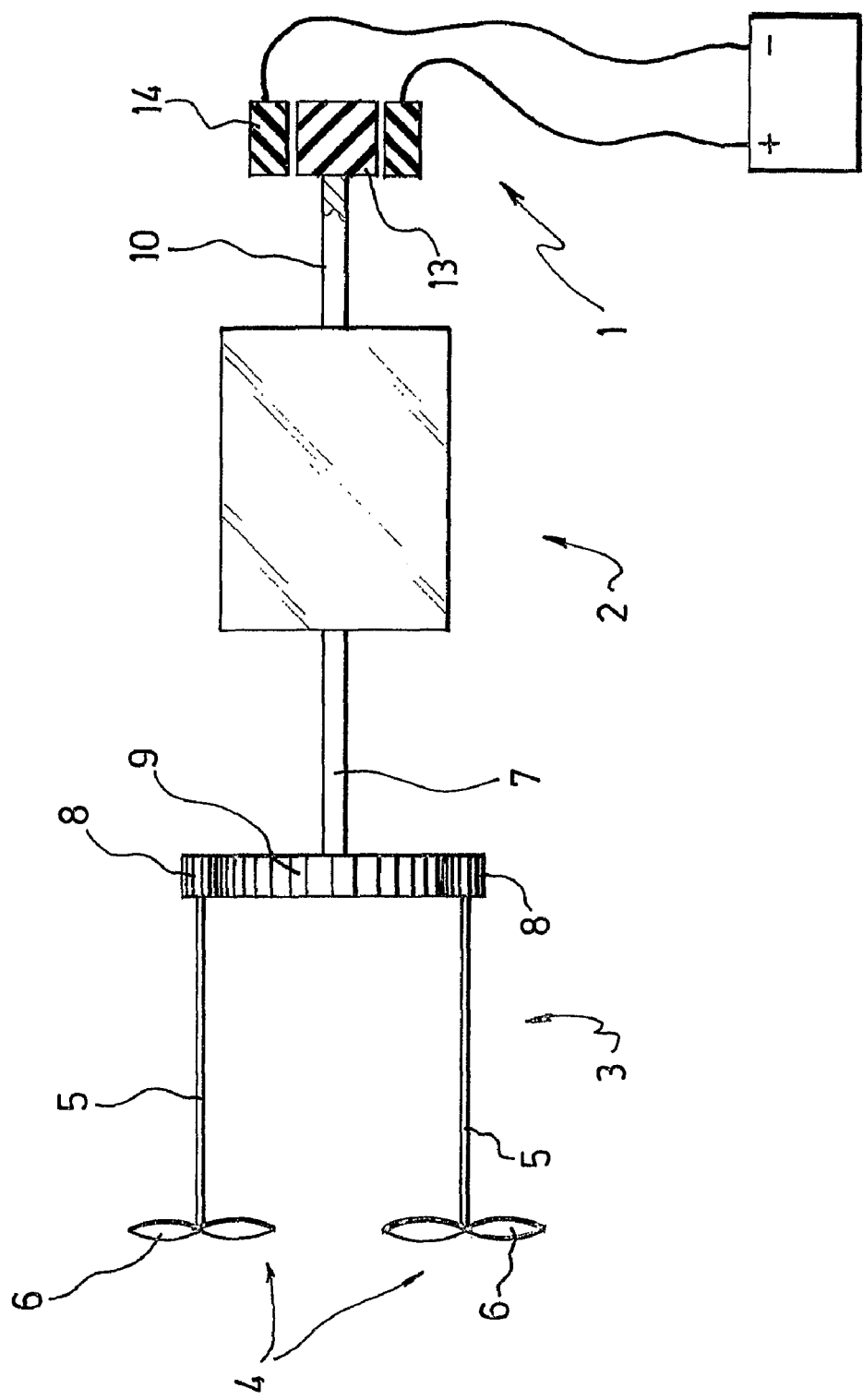
FIG. 1 is a schematic sectional view of a wind-powered device for producing electrical energy according to one embodiment of the invention.

FIG. 1 presents a wind-powered device including a generating set 1 for electrical energy, a wind-powered assembly 3 and a transmission 2 arranged between the wind-powered assembly 3 and the generating set 1, so as to be able to transmit mechanical energy produced by the wind-powered assembly 3 to the generating set 1 for electrical energy.

According to the embodiment shown in FIG. 1, the wind-powered assembly 3 includes two axial air turbines, so-called wind turbines 4. An axial air turbine is a rotary device that is suitable to receive the force of the wind and to convert it into mechanical energy which is expressed in the rotation of a shaft, this shaft having to be situated, as far as possible, within the axis of the airflow.

According to other embodiments, the wind turbines may be air turbines with a vertical axis, in particular of the Savonius type or Darrieus type.

According to the embodiment shown in the Figures, each wind turbine 4 has a shaft 5, around which blades 6 are arranged. The shafts 5 of the two wind turbines 4 are non-coaxial. According to the advantageous embodiment represented in the Figures, these shafts 5 are parallel to one another. According to other embodiments, these shafts 5 may be non-parallel, for example for wind-powered devices which are not equipped with a weather-vane system and the wind of which pertaining to the region of installation of this wind-powered device blows repeatedly in one or more preferential directions; a first set of wind turbines may then be arranged in such a way that the shafts of these wind turbines are within the axis of one of the preferential directions, and a second set of wind turbines may be arranged in such a manner that the shafts of these wind turbines are within the axis of the other preferential direction.

The wind turbines 4 may be of any type known as such. The shaft 5 of each wind turbine is coupled to a shaft, the so-called input shaft 7, of the transmission 2. According to the embodiment shown in FIG. 1, this coupling is realised by means of a gear system. In order to do this, the shaft 5 of each wind turbine has a pinion 8 arranged at the end of the shaft 5, opposite the blades 6. These pinions 8 are engaged in a driven pinion, the so-called toothed wheel 9.

These pinions 8 and this toothed wheel 9 are chosen in such a way that the induced transmission ratio is in conformity with the use being sought and preferably complies with the standards in force. For example, the numbers of teeth are, if possible, chosen firstly amongst themselves in such a way that each tooth of each pinion 8 strikes each tooth of the toothed wheel 9. The toothed wheel 9 preferably has a number of teeth that is greater than the number of teeth of each pinion 8, so that the input shaft 7 is driven in rotation at a speed that is lower than the speed of rotation of each of the wind turbines 4, and so that the torque of the input shaft 7 is greater than the torque of each of the wind turbines 4. The input shafts 7 may be regarded as the slow shafts of the wind-powered device.

The input shaft 7 of the transmission 2 is coupled to a transmission 2. This transmission 2 may have several shafts and several devices for coupling so as to modify the torque and/or the speed of rotation. The transmission ratio of this transmission 2 is preferably chosen in such a way that the speed of rotation at the output of the transmission 2 is higher than the speed of rotation of the input shaft 7. In this way, a primary shaft 10 coupled to the transmission 2 may have a high speed of rotation that is suitable to ensure the generation of a substantial amount of electrical energy. The primary shaft 10 may thus be regarded as the fast shaft of the wind-powered device. This transmission 2 is known and is not described in detailed manner. According to an embodiment of the invention, this transmission 2 is a direct transmission 2 between the input shaft 7 and the output shaft 10.

The output shaft 10 is linked to the generating set 1 for electrical energy. According to an embodiment of the invention, the generating set 1 includes a single rotating electrical machine, enabling the costs of a wind-powered device according to the invention to be substantially reduced. This electrical machine includes, according to the embodiment shown in FIG. 1, a rotor 13 and a stator 14 which are suitable to enable the generation of electrical energy by the rotation of the rotor 13 in relation to the stator 14. This rotor 13 may be arranged directly on the output shaft. This electrical machine may be, in known manner, an alternator with permanent magnets, a d.c. generator or a brushless alternator.

The various shafts of the wind-powered device according to the invention are mounted on bearings in conventional manner. The bearings of the transmission are preferably arranged inside a casing, not represented in the Figures.

Figure 2:
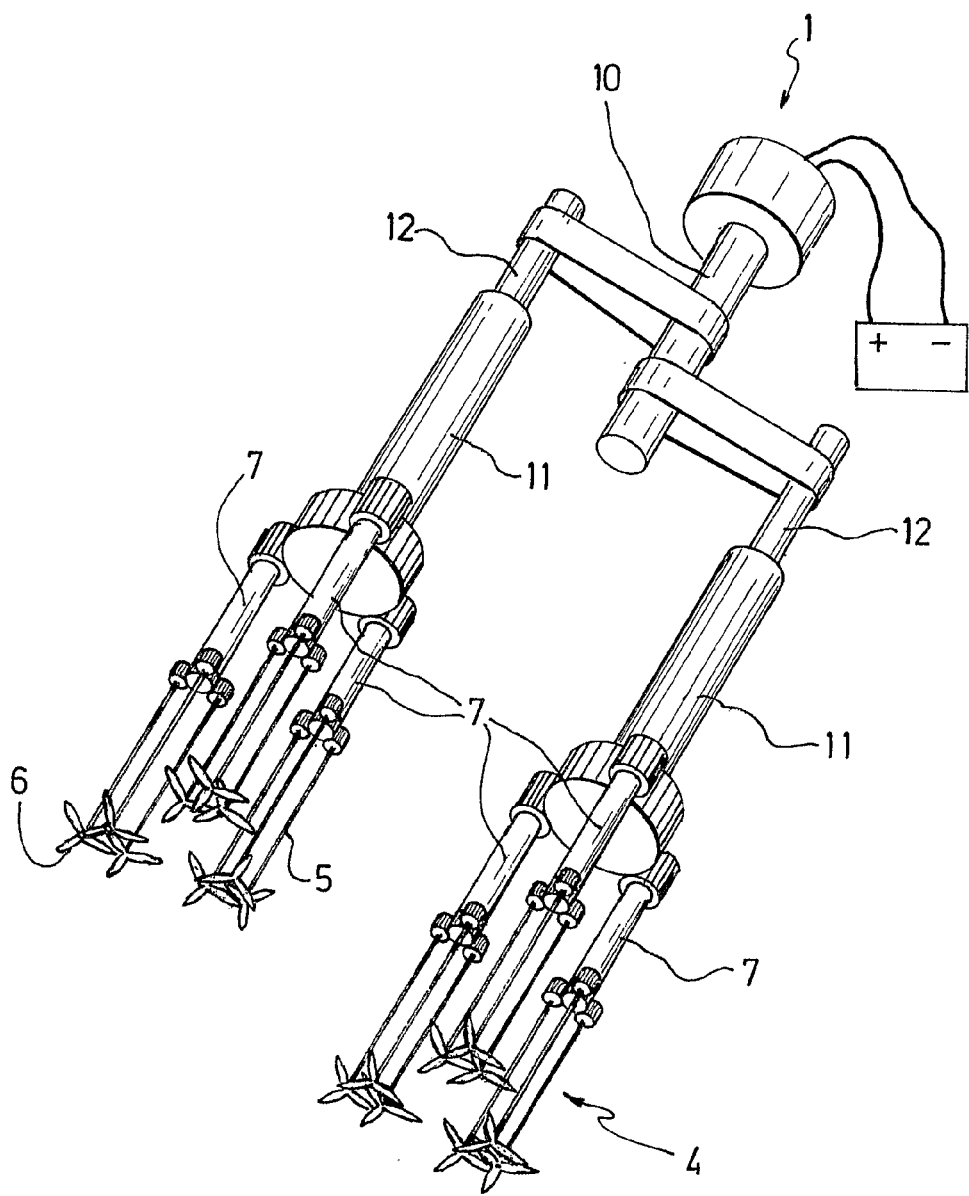
FIG. 2 is a schematic perspective view of a wind-powered device according to another embodiment of the invention.

FIG. 2 presents another embodiment of the invention, including a plurality of wind turbines that are non-coaxial in relation to one another. In this Figure, a non-limiting embodiment of the transmission enters the wind-powered assembly, and the generating set has been represented.

In this Figure each input shaft 7 is driven in rotation by three wind turbines 4. According to other embodiments, an input shaft 7 may be driven in rotation by more than three wind turbines, and each input shaft 7 is not necessarily driven in rotation by an equal number of wind turbines 4. Moreover, one wind turbine 4 may have more than one wheel with blades 6, arranged on its shaft 5.

According to the embodiment shown in FIG. 2, each input shaft 7 is, in turn, coupled to a shaft, the so-called first intermediate shaft 11. Each first intermediate shaft 11 is coupled to another shaft, the so-called second intermediate shaft 12. Each second intermediate shaft 12 is coupled to the output shaft 10. Of course, according to other embodiments the transmission may have a different number of intermediate shafts.

The couplings between the various shafts may be realised by means of gear systems according to the principle of FIG. 1. According to other embodiments, these couplings are couplings by means of bevel gears, hypoid gears, cylindrical gears, herringbone gears, worm gears, etc, or gear trains, such as epicyclic trains, spherical trains, etc.

According to other embodiments, these couplings are belt couplings, hydraulic couplings, magnetic couplings, etc.

FIG. 2 presents, by way of example, a belt coupling between each second intermediate shaft 12 and the primary shaft 10. These couplings are known as such and are not described in detailed manner.

A wind-powered device according to the invention is particularly intended and suitable for generating electrical energy for an individual dwelling. Also, in a manner so as to limit, in particular, the aerodynamic noises resulting from the rotation of the wind turbines, a wind-powered device has blades of small dimensions, the aerodynamic noise generated being proportional, at constant wind speed, to the length of the blades of the wind turbine.

In order to do this, each wind turbine 4 according to the invention preferably has blades with a length of less than 30 cm, in particular with a length of the order of 10 cm, and with a width of less than 10 cm, in particular of the order of 5 cm. The area of the surface swept by the blades 6 is therefore preferably less than 0.78 square meters, in particular of the order of 0.03 square meters.

The blades 6 of the wind turbine are preferably blades made of plastic material, in particular they are injection-moulded plastic blades, so as to reduce the costs of manufacture as much as possible. According to other embodiments, these blades 6 may be manufactured from another material, in particular from wood, glass fibre, carbon fibre, etc. According to the embodiment shown in the Figures, each wind turbine 4 has three blades 6 arranged around the shaft 5 of the wind turbine 4. According to other embodiments, the wind turbines 4 may have a smaller or larger number of blades, the number of blades determining the torque at start-up of a conventional wind turbine having blades with a horizontal axis.

According to the embodiment of the invention in which the wind turbines sweep surface areas of the order of 0.03 square meters, a wind-powered device including two hundred wind turbines covers an equivalent surface area of 6 square meters and can deliver, in a wind of 25 km/h, a power of 297 W. If the blades have lengths of 20 cm, the area of the swept equivalent surface is 25 square meters, and the power delivered in a wind of 25 km/h is 1.16 kW. It therefore appears that the energy potential of a wind-powered device according to this embodiment is identical to a single wind turbine, the blades of which would have a length of 2.82 meters. The realisation of such a wind turbine proves to be much more complex in practice than the realisation of a device according to the invention.

Furthermore, in the event of failure of one of the wind turbines of a device according to the invention the wind-powered device can continue to produce energy, whereas in the case of a single equivalent wind turbine a failure cannot be tolerated without the penalty of interrupting the production of energy.

FIG. 3 presents a possible use of a wind-powered device according to an embodiment of the invention.

In FIG. 3 a dwelling 15 has a roof with 25 square meters of surface area, on which is arranged a wind-powered device according to an embodiment of the invention, including two hundred wind turbines 4 (not all represented in FIG. 3, for the purposes of clarity), each wind turbine 4 having blades with a length of 20 cm. Consequently, in an average wind of 25 km/h such a device can deliver a power of 1.16 kW. If a surface area of 100 square meters is considered, it is possible to arrange there eight hundred wind turbines, each one having blades with a length of 20 cm. In this configuration a device according to the invention is capable of generating a power of 5 kW in a wind of 25 km/h, and a power of 70 kW in a wind of 60 km/h.

According to one embodiment, a device according to the invention includes at least two hundred wind turbines, in particular four hundred wind turbines, each wind turbine having at least two blades 6 with a length of 10 cm, so that the area of the surface swept by each wind turbine 4 is of the order of $0.01\pi$ square meters, said device then being suitable to produce at least 0.310 kW, in particular 0.621 kW, in the presence of an average wind of 25 km/h.

According to the embodiment shown in FIG. 3, the generating set includes a single generator. According to other embodiments, the generating set may include several generators, for example a generator arranged at the end of each of the three rails 16, each rail 16 being driven in rotation by a plurality of wind turbines 4.

The invention is not limited solely to the embodiments that have been described. In particular, a wind-powered device according to the invention may have varied configurations and may include wind turbines of different sizes and couplings, not described, between the various shafts of the various wind turbines.

A wind-powered device according to the invention may also include non-axial wind turbines of the anemometer type or of other type.

A wind-powered device according to the invention makes it possible to provide a reasonable power for domestic applications, and appears to be appropriate for an auxiliary energy supply.

A wind-powered device according to the invention is advantageously linked to a solar device for generating electrical energy. In particular, a wind-powered device according to the invention is advantageously linked to an accumulator, this accumulator preferably being rechargeable by the wind-powered device and by an associated solar device.

A wind-powered device according to the invention is a device for generating clean and renewable energy.

Furthermore, a wind-powered device according to the invention is economical, not very noisy, and for this reason can be set up in urban and periurban zones.

The invention claimed is:

1. A wind-powered device for producing electrical energy, including:
   a generating set suitable to generate electrical energy by conversion of mechanical energy into electrical energy,
   a wind-powered assembly suitable to capture the energy from the wind and to convert it into mechanical energy,
   a transmission arranged between said wind-powered assembly and said generating set, said transmission being suitable to transmit mechanical energy produced by said wind-powered assembly to said generating set,
   said wind-powered assembly including at least two wind turbines, each wind turbine having a shaft, said shafts of said at least two wind turbines being non-coaxial and coupled to said transmission and arranged in such a way that said wind turbines are able to present an equivalent surface area to the wind that is greater than the windward surface area of each of the wind turbines,
   said transmission having at least one input shaft coupled to said wind-powered assembly, said at least one input shaft being driven in rotation by said at least two non-coaxial shafts of said at least two wind turbines pertaining to said wind-powered assembly,
   at least one driven pinion mounted on said at least one input shaft of said transmission,
   and at least two driving pinions respectively mounted on said at least two non-coaxial shafts of two wind turbines, said at least two driving pinions having different numbers of teeth from each other, and being engaged with a same driven pinion, so that said two wind turbines are able to drive said input shaft in rotation.

2. The device as claimed in claim 1, wherein said transmission includes couplings between said at least two non-coaxial shafts of said at least two wind turbines and said input shaft by means of belts.

3. The device as claimed in claim 1, wherein said transmission includes hydraulic couplings between said at least two non-coaxial shafts of said at least two wind turbines and said input shaft.

4. The device as claimed in claim 1, wherein said wind-powered assembly includes wind turbines with non-coaxial shafts and wind turbines with coaxial shafts.

5. The device as claimed in claim 1, wherein each wind turbine has at least two blades arranged around its shaft and suitable to drive this shaft in rotation from the action of the wind, said blades having lengths less than 30 cm.

6. The device as claimed in claim 1, wherein said wind-powered assembly includes at least fifty wind turbines.

7. The device as claimed in claim 1, wherein said generating set includes a single generator.

8. The device as claimed in claim 1, wherein said wind-powered assembly includes at least two hundred wind turbines, each wind turbine having at least two blades with a length of 10 cm, so that the area of the surface swept by each wind turbine is of the order of $0.01\pi$ square meters, said device then being suitable to produce at least 0.310 kW in the presence of an average wind of 25 km/h.

9. The device as claimed in claim 1, wherein said wind-powered assembly includes four hundred wind turbines.

* * * * *